United States Patent
Hamilton, II et al.

(10) Patent No.: US 8,788,952 B2
(45) Date of Patent: Jul. 22, 2014

(54) SYSTEM AND METHOD FOR LOCATING MISSING ITEMS IN A VIRTUAL UNIVERSE

(75) Inventors: Rick A. Hamilton, II, Charlottesville, VA (US); Michael D. Kendzierski, New York, NY (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 848 days.

(21) Appl. No.: 12/553,432

(22) Filed: Sep. 3, 2009

(65) Prior Publication Data
US 2011/0055733 A1    Mar. 3, 2011

(51) Int. Cl.
G06F 3/048    (2013.01)
(52) U.S. Cl.
USPC ............................................. 715/757; 715/706
(58) Field of Classification Search
USPC .......................... 715/757; 707/770; 345/419
See application file for complete search history.

(56) References Cited

U.S. PATENT DOCUMENTS

| | | | | |
|---|---|---|---|---|
| 5,960,411 A * | 9/1999 | Hartman et al. | ............ | 705/26.81 |
| 6,119,229 A * | 9/2000 | Martinez et al. | ................ | 726/28 |
| 6,694,357 B1 * | 2/2004 | Volnak | ............................ | 709/218 |
| 6,767,287 B1 * | 7/2004 | Mcquaid et al. | ................ | 463/42 |
| 6,784,901 B1 * | 8/2004 | Harvey et al. | .................. | 715/757 |
| 7,249,139 B2 * | 7/2007 | Chuah et al. | ........................... | 1/1 |
| 7,298,378 B1 * | 11/2007 | Hagenbuch et al. | ........... | 345/589 |
| 7,620,630 B2 * | 11/2009 | Lloyd et al. | ............................ | 1/1 |
| 8,099,392 B2 * | 1/2012 | Paterson et al. | ................ | 707/654 |
| 2004/0095239 A1 * | 5/2004 | Schwartz et al. | ......... | 340/539.13 |
| 2004/0266505 A1 * | 12/2004 | Keam et al. | ......................... | 463/1 |
| 2005/0049972 A1 * | 3/2005 | Hsu et al. | .......................... | 705/53 |
| 2005/0223034 A1 * | 10/2005 | Kaneko et al. | .............. | 707/104.1 |
| 2006/0023626 A1 * | 2/2006 | Krausz | ............................ | 370/220 |
| 2006/0132308 A1 * | 6/2006 | Stump et al. | ................ | 340/572.1 |
| 2006/0246970 A1 * | 11/2006 | Smith et al. | ........................ | 463/1 |
| 2007/0201750 A1 * | 8/2007 | Ito et al. | ........................ | 382/228 |
| 2007/0293319 A1 * | 12/2007 | Stamper et al. | .................. | 463/42 |
| 2008/0141147 A1 * | 6/2008 | Buhrke et al. | ................ | 715/757 |
| 2008/0186183 A1 * | 8/2008 | Nagai et al. | ................. | 340/572.1 |
| 2009/0112993 A1 * | 4/2009 | Miyamoto et al. | ............ | 709/205 |

(Continued)

OTHER PUBLICATIONS

Fred Charles; User Intervention in Virtual Interactive Storytelling, May 16-18, 2001; Virtual Reality International Conference, pp. 1-6.*

(Continued)

Primary Examiner — Phenuel Salomon
(74) Attorney, Agent, or Firm — Whitham, Curtis, Christofferson & Cook, P.C.; Lisa J. Ulrich

(57) ABSTRACT

The present invention provides a system and method for tagging Virtual Universe items as owned by a particular user and to use such tags to enable users and/or system administrators to locate lost or stolen items in a Virtual Universe. When items identified are located, the user/owners may be notified of the location or missing items; alternatively, the items may be automatically returned to the user/owners' inventories. By enabling differentiation between items that may be lost, stolen, or left intentionally in a Virtual Universe, the present invention addresses difficulties that may arise in managing the various items that populate a Virtual Universe, especially as a Virtual Universe expands or as Multiple Virtual Universes expand and partner with additional Virtual Universes.

17 Claims, 7 Drawing Sheets

(56) References Cited

U.S. PATENT DOCUMENTS

2009/0158161 A1* 6/2009 Gibbs et al. .................. 715/733
2010/0053187 A1* 3/2010 Arrasvuori et al. ........... 345/581
2010/0325154 A1* 12/2010 Schloter et al. ............... 707/770

OTHER PUBLICATIONS

Shichao Ou; Augmented Virtual Reality Interface for Assistive Monitoring of Smart Spaces; Jan. 6, 2004; IEEE; pp. 1-10/.*
Shun-Yun Hu; Sacalable Peer-to-Per Network for Virtual Environments; Jul./Aug. 2006; IEEE; pp. 1-10.*

* cited by examiner

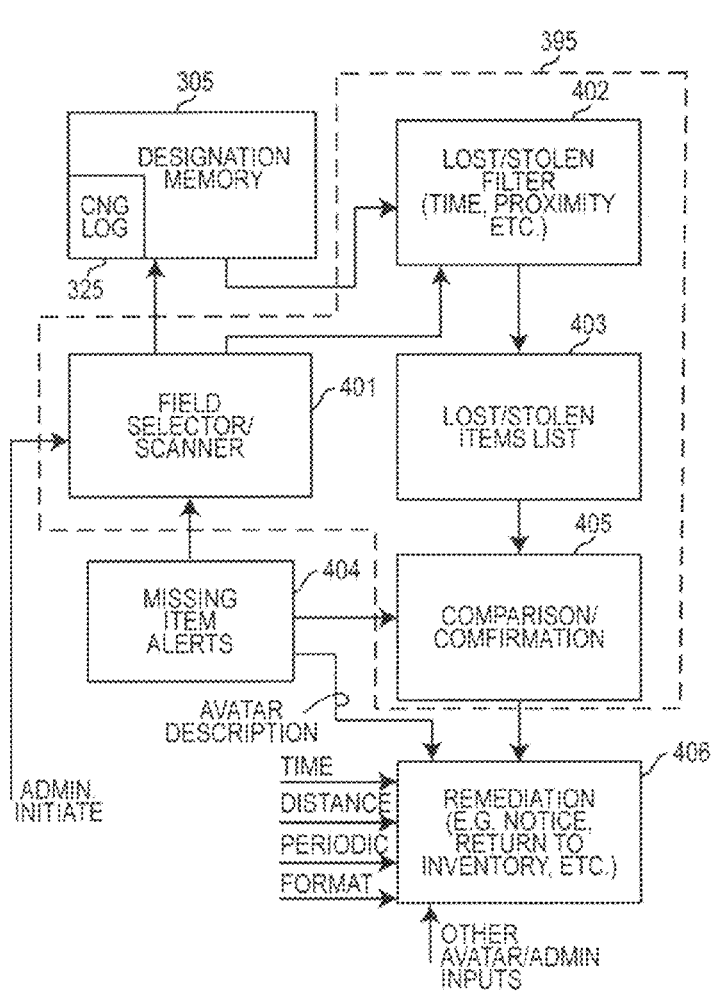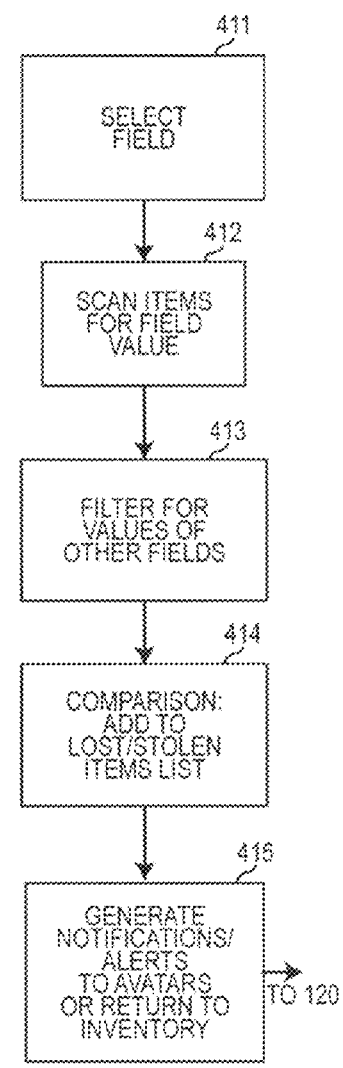
Figure 4A
Figure 4B

SYSTEM AND METHOD FOR LOCATING MISSING ITEMS IN A VIRTUAL UNIVERSE

CROSS-REFERENCE TO RELATED APPLICATIONS

This invention is related to a previous invention by the same inventors entitled "System and Method for the Designation of Items in a Virtual Universe," U.S. patent application Ser. No. 12/553,501, entitled "System and Method for the Designation of Items in a Virtual Universe" which is fully incorporated herein by reference.

FIELD OF THE INVENTION

The present invention generally relates to the production and management of interactive virtual universes presented to users on computers linked by a network and, more particularly, to tracking and locating virtual objects within one or more virtual universes.

BACKGROUND OF THE INVENTION

Closely following the introduction of computer generated graphic representations of objects, computers games have been developed and have become popular to the point of becoming a significant industry. A significant factor in the continuing popularity of such games may possibly be the fact that the simulated venue or environment in which the game is played is limited only by the imagination of the game developer and can be presented to a viewer on a display with a realistic appearance which is limited only by the hardware and software employed to render associated images. Moreover, such simulated environments may be changed at will and very rapidly with rules of the game often being altered with the simulated environment. Connections of computers through networks such as the Internet have also allowed interactive participation in the same game simultaneously or at will by numerous participants.

As a synthesis of such games with other capabilities of the Internet such as interactive chat rooms, advertising and marketing and access to massive amounts of information and the like, so-called Virtual Universes (sometimes referred to as "metaverses" or "3D Internet") have been developed and made available to the public in recent years.

A Virtual Universe is a computer-based simulated environment intended for users thereof (referred to as "residents" or "agents") to inhabit, traverse and interact through the use of avatars. An avatar, in the context of a Virtual Universe, is a graphical representation of a user which has an appearance that is freely selectable that the user can control and other participants can see, often taking the form of a cartoon-like human which can move through the regions of the Virtual Universe represented by 3D graphics and landscapes which may or may not resemble the real world in terms of physical laws, building environments, geography and landscapes. Some examples of virtual universes available to the public include Second Life® ("Second Life" is a trademark of Linden Research, Inc. in the United States and/or other countries), Entropia Universe™ ("Entropia Universe" is a trademark of Mindark PE AB in Sweden and/or other countries), and There® ("There" is a trademark of Forterra Systems, Inc. in the United States and/or other countries). Examples of massively multiplayer online games include EverQuest® ("EverQuest" is a trademark of Sony Online Entertainment, LLC in the United States and/or other countries), Ultima Online® ("Ultima Online" is a trademark of Electronic Arts, Inc. in the United States and/or other countries) or World of Warcraft World of Warcraft® ("World of Warcraft" is a trademark of Blizzard Entertainment, Inc. in the United States and/or other countries). Publically available virtual universes and/or massively multiplayer online games are operated by persons or companies who provide servers to generate portions of the Virtual Universe and which may impose a charge for participation as a resident, to establish a particular object or environment (sometimes referred to as an "island") within the Virtual Universe, present advertising and the like or combinations thereof. In short, an avatar controlled by a resident can interact with other avatars, objects and portions of the immediate environment of the avatar in much the same way a person would interact with other persons, objects and portions of the environment in the real world but where transportation between portions of the Virtual Universe may be nearly instantaneous (e.g. referred to as "teleporting") and objects and local environments within the Virtual Universe may be entirely developed at will to resemble the real world closely, not at all or with any degree of realism or fantasy in between which may be provided by the administrator of the Virtual Universe or users of the Virtual Universe, often for a not insubstantial fee. Further, once such objects or local environments become part of a Virtual Universe, fees can be charged for use made of them through avatars. On the other hand, many entities have found it advantageous to provide environments closely resembling real world facilities or locales to allow users to experience, though avatars and with a significant degree of realism, particular locales in the real world and a sampling of the likely inhabitants thereof.

Currently if an item is lost or stolen in a Virtual Universe, a user must engage the following manual options to locate the items:

User sends message to the Virtual Universe administrators or perhaps avatars last seen around the item asking for help to locate lost or stolen item.

User roams around last known location of missing or stolen item and interacting with users trying to locate the lost or stolen item.

In some virtual universes, a lost-and-found function is implemented, but this is not normally invoked, and may not be triggerable, while a user is logged onto the system. For example, in the prior art, an item may be returned if a user leaves it behind, logs off, and then logs on. If a user wishes to recover an item more quickly, a user must conduct an active manual search for a missing item and may expend considerable time while the search may be inefficient because the user is unlikely to be able to identify and contact either as many people as possible or the people most likely to be helpful in finding the missing item. Similarly, such a manual search may not be effective if, for example, an item is stolen and then destroyed.

SUMMARY OF THE INVENTION

It is therefore an object of the present invention to provide a system and method for tagging Virtual Universe items as owned by a particular user and to use such tags to enable users and/or system administrators to search for and locate lost or stolen items in a Virtual Universe. The present invention thus facilitates the recovery of lost or stolen items in a Virtual Universe.

The invention provides a system and method to enable a virtual universe grid to determine objects that may be lost, missing or stolen within a virtual universe or across multiple virtual universes to enable recall of lost, missing or stolen items as well as automated detection and alerting to VU administrators, software agents and/or other users.

The present invention is preferably implemented with a system for providing designations of items which may be left on a landscape of an island with associated permissions/ prohibitions in regard to interactions other avatars may have with the item and can differentiate between items that may be lost or stolen and objects intentionally left at a location in a Virtual Universe. This feature addresses difficulties that may arise in policing and/or managing the various items that populate a Virtual Universe, especially as a Virtual Universe expands or as Multiple Virtual Universes expand and partner with additional Virtual Universes.

The present invention facilitates the tracking and recovery of lost or stolen items in a Virtual Universe. This type of service may create additional revenue opportunities for Virtual Universe operators since millions of dollars of items are created and millions of dollars of transactions are conducted each day by large corporations and by entrepreneurs. Value is added by providing the ability to track missing, stolen or vandalized items within a Virtual Universe. Further value is added by enabling a Virtual Universe user to alert other users about a particular lost or stolen item in order to obtain assistance in recovering the item.

The present invention may further be used to deter theft and vandalism in a Virtual Universe by providing a mechanism for generating alerts that such acts are taking place within the Virtual Universe or multiple Virtual Universes. Because the generic term "item" refers to both objects and users, the present invention also may make Virtual Universes more "family friendly" by helping to locate missing users where, for example, a family member or guardian is active within the Virtual Universe in a privacy mode that makes it difficult to locate the user's avatar. For privacy and other reasons, it is assumed that such services will require a registration process where parties must opt in prior to participation.

The present invention provides a system, a method, and a machine-readable medium with instructions for a computer to locate missing items in a virtual universe by: (a) using a computer hosting a virtual universe used by multiple users to assign a unique identifier designating a particular item as owned by a particular user, such computer being connected to a network to which one or more user terminals for users of the virtual universe are also connected; (b) using a database accessible by the a computer hosting the virtual universe to store the unique identifier designating the item in question as owned by that user, such database containing metadata for items in the virtual universe, such metadata including a unique identifier designating a particular item as owned by a particular user, with, the database being in communication with the computer to exchange information enabling the computer to use the metadata to scan the virtual universe for the unique identifier of the item; (c) using the computer to scan the virtual universe for the unique identifier; and (d) using the computer to send output to a user interface connected to a user terminal to inform the item's owner as to the item's location in the virtual universe.

An alert may or may not be issued to users of the virtual universe providing notice that the item is being searched for by a process to determine the location of the item in the virtual universe. If such an alert is issued, it may or may not include instructions for a user of the virtual universe to speak to a system administrator using a telecommunications system, which may or may not be an IP telephony capability integral to the virtual universe. In addition, an alert may or may not include a description of an avatar of a user believed to have taken the item. Alerts may go to users including the missing item's owner as well as users other than the missing item's owner.

The graphic rendering of the item being searched for may or may not be changed in connection with the process of searching for the missing item. An item may or may not be automatically moved from the location in which it is found to the owner's inventory of virtual universe items when the location of the item is determined. An item to be located may or may not be the avatar of another user of the virtual universe.

The network connecting the computer hosting the virtual universe to one or more user terminals may or may not be the Internet. A user terminal may be a general purpose programmable computer, a personal digital assistant, a telephone, or any other user terminal configured as a client of the computer hosting the virtual universe.

BRIEF DESCRIPTION OF THE DRAWINGS

The foregoing and other objects, aspects and advantages will be better understood from the following detailed description of a preferred embodiment of the invention with reference to the drawings, in which:

FIGS. 4A and 4B illustrate a preferred architecture for a lost/stolen item detector and a flow chart illustrating an exemplary mode of operation thereof, respectively;

DETAILED DESCRIPTION OF A PREFERRED EMBODIMENT OF THE INVENTION

Understanding the following terminology is important for an appreciation and understanding of the features of the present invention:

The generic term item refers to both objects and users (or avatars of users).

A standardized identifier, such as Universally Unique Identifiers (UUIDs), is used to create items, assets, avatars, the environment, and anything visual. Use of a standardized format for identifiers enables information to be combined into a single database without a need to resolve name conflicts, textures (which may be distributed to users as graphics files such as JPEG2000 files), and/or effects data (which may be rendered by a user's client according to the user's preferences and device capabilities).

An alert in a Virtual Universe is a graphical or text-based alerting system that may be sent to registered virtual users and/or to registered virtual users in a certain proximity to the lost or missing item.

In some cases, a registered virtual user may receive all alerts regardless of physical location and proximity.

In some cases, an ordinary virtual user may receive alerts only if certain specified criteria are met.

Virtual Universe administrators have responsibility for managing the health, well-being and resources within a particular Virtual Universe.

Multiple Virtual Universes may include a Virtual Universe partnering and sharing data and information with other Virtual Universe. Such Virtual Universes may be operated by different companies but nonetheless managed to permit interaction between them.

A allowed list or blocked list may be used by a Virtual Universe to allow items to be designated only by certain users. This may be useful, for example, to prevent spamming. An allowed list may be used for authorizing access and a blocked list may be used for de-authorizing access within a Virtual Universe.

Figure 1:
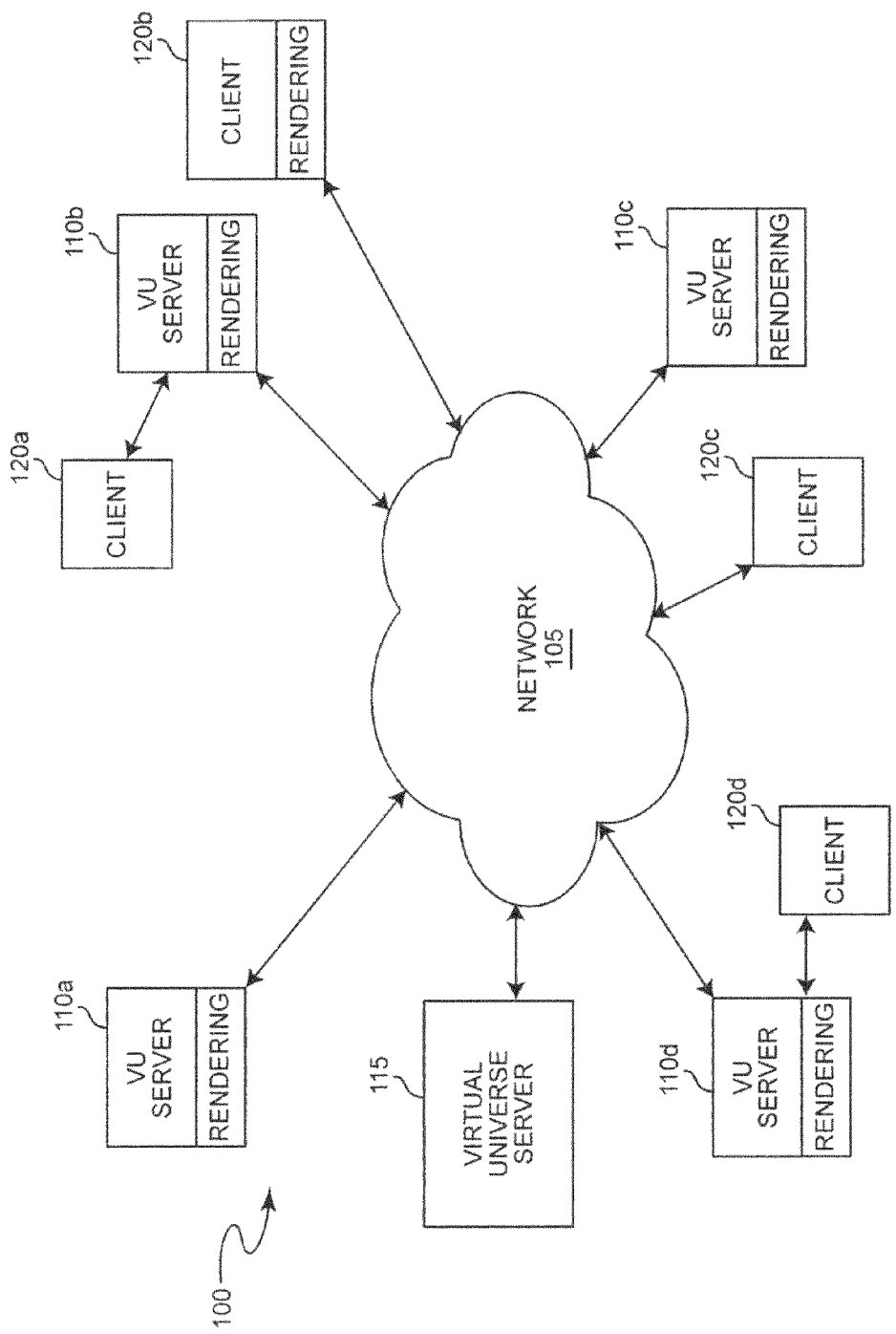
FIG. 1 is a high-level block diagram or data flow diagram of a network-based Virtual Universe.
Figure 2:
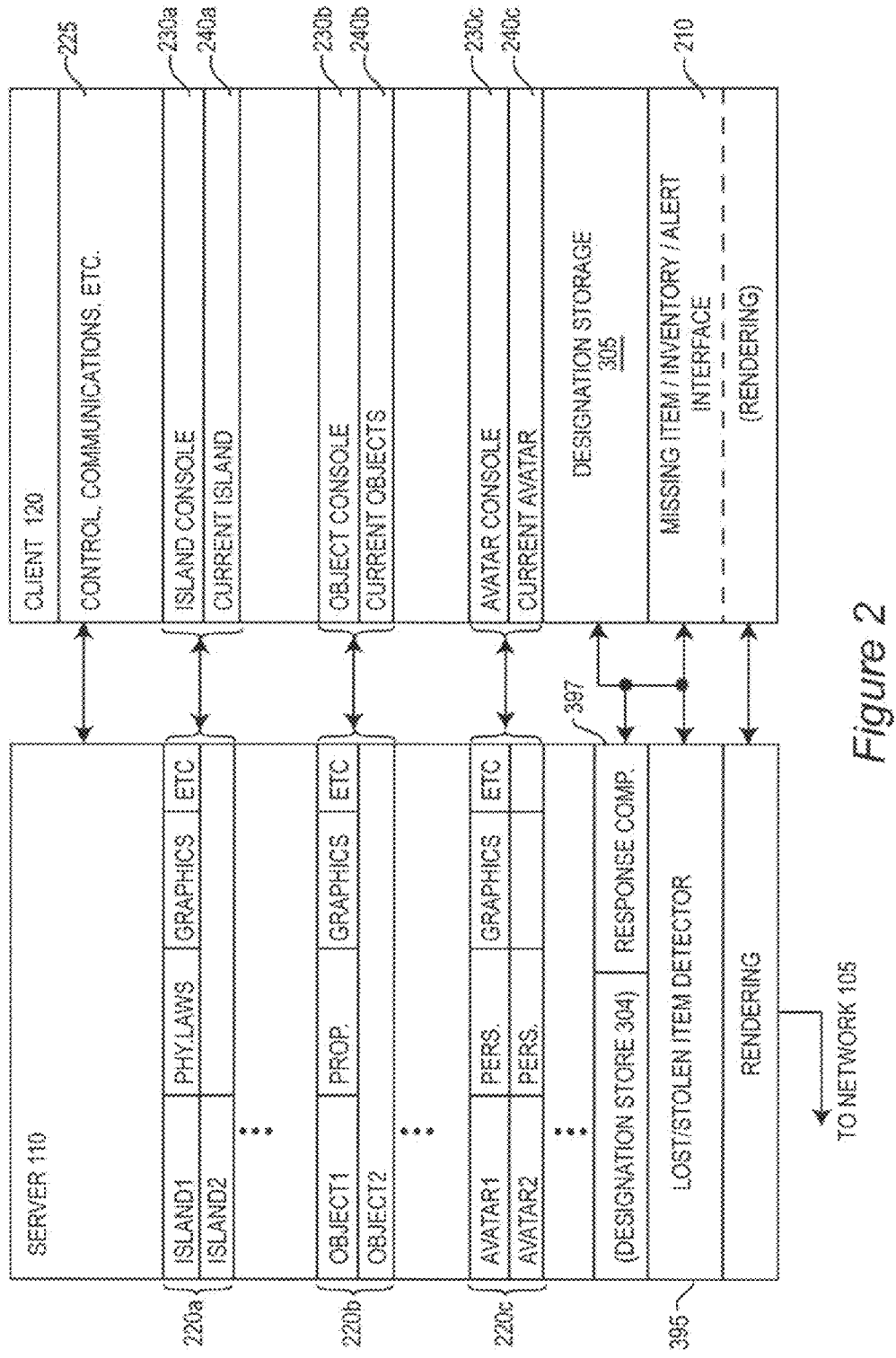
FIG. 2 shows the nature of communications generally depicted in FIG. 1.

Referring now to the drawings, and more particularly to FIG. 1, there is shown a high-level diagram of a network implementing a virtual universe (VU). FIG. 2 is a similarly high-level block diagram illustrating functional relationships between a client terminal and a server implementing a VU and between which network 105 may or may not be interposed. FIGS. 1-2 are principally arranged to facilitate an understanding of the overall general operation of a virtual universe and do not and are not intended to represent any particular known implementation of a VU. Further, at the high level of abstraction with which a VU is represented in FIGS. 1 and 2, these figures are intended principally to convey a general understanding of a VU and its general operation and preferred logical placement therein of functional elements by which the invention is implemented. Therefore, no portion of FIG. 1 or 2 is admitted to be prior art in regard to the invention. It should also be borne in mind that VU implementations have become relatively sophisticated and the underlying technology relatively mature such that enhancements thereto, such as those provided by the present invention, must be interoperable with existing network and VU infrastructure.

It should also be recognized that operation of a VU is extremely processing intensive and, while large amounts of computing resources may be accessible through a network, graphics generation and rendering must be distributed and managed in such a way as to provide images of portions of the VU in a very short period of time in order to be acceptable to residents of the VU, particularly in regard to updating views as avatars are manipulated and as teleportation between islands of the VU occur. Further, substantial portions of the control of avatars must be automated in order to keep the manipulation effort required of a resident within reasonable bounds while providing meaningful and reasonably logical and realistic interactions with environments, objects and other avatars. Thus, to reduce the number of avatar control parameters which must be controlled by a user to a practical level, each environment/island, object and avatar must be personalized (e.g. have a personality, properties, including ownership, and the like) as well as many properties and attributes (e.g. behaviors, preferences such as for delivery of information and defaults) which must be transmitted efficiently, generally as metadata, between potentially a large number of processors which perform the rendering thereof. The rendering or partial rendering is then distributed in some form to the terminals through which residents interact with the VU where rendering is often completed by application of textures and the like which may be more efficiently communicated as files and locally applied to a partial (e.g. wireframe) rendering.

In the following discussion, the term "rendering" will be used to denote the entirety of processing performed on the definitions of landscapes, environmental features, avatars and/or objects as contained in metadata in order to produce signals which can be used to drive a display to produce a graphical image. Such processing will, for example, include projection of the location of an object in the virtual environment to a location in a two-dimensional representation from a particular viewing point, positioning and orienting geometric coordinates of graphic primitives approximating environment features, objects or avatars or parts thereof, making hidden line calculations, generating surface textures, generating lighting and shading effects and their interactions between objects and the like to construct a scene and, as such, constitutes a substantial processing burden. As a practical matter in view of current communications bandwidth constraints, distribution of processing power and storage over a network, hardware and software compatibility and issues of data transmission delays and latency, some aspects of scenes are usually constructed at a server and transmitted over the network as positions, graphics primitives and geometric coordinates (sometime referred to as a pre-image) while hidden line and surface computations, generation of textures, lighting and shading effects and the like for final image presentation (which are well-developed and routine processes that can be performed on relatively inexpensive hardware such as a graphics card) are generally performed on such hardware in a client processor. However, the location where the rendering process or portions thereof are performed is not important to the practice of the invention while the critical aspect of rendering for VU performance is the overall processing load the entire process imposes on a VU system, particularly when teleportation is performed.

Figure 6:
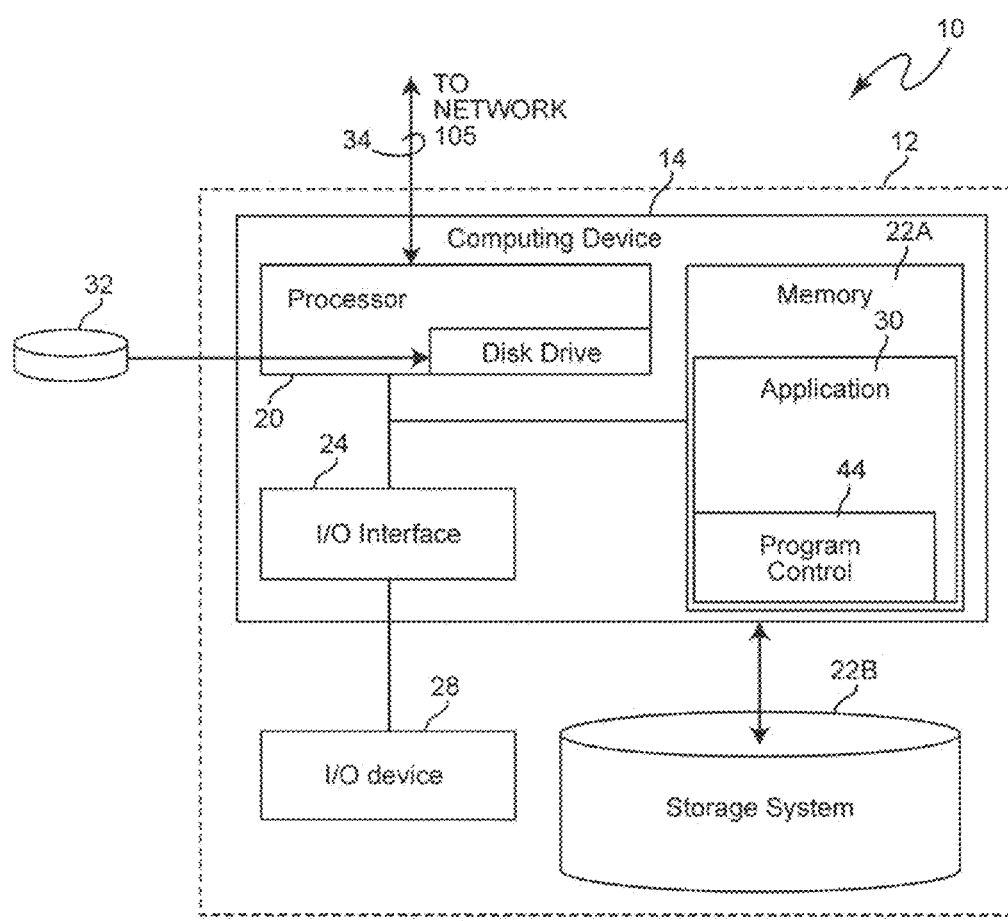
FIG. 6 is a schematic illustration of a user terminal suitable for practice of the present invention.

More specifically, as illustrated in FIG. 1, the overall network and system 100 will be recognized as substantially the same as that of the Internet. Other functional elements such as firewalls, proxies and the like may be included for purposes of security, reliability and the like but are not important to the successful practice of the invention. Network 105, such as the Internet, provides communications between all VU servers 110a-110d and at least one virtual universe server 115 which establishes the basic VU topology, characteristics, rules and the like and maintains membership and billing information in regard to residents (users). Clients 120a-120d are essentially user terminals and may communicate with the network 105 and VU server 115 either directly or through a VU server although that distinction is unimportant to the practice of the invention, as well. A suitable processor architecture is illustrated in FIG. 6 and discussed below.

Referring now also to FIG. 2, the nature of communications generally depicted in FIG. 1 will be explained in greater detail but also with a degree of generality since many variations thereof may be employed. It will be readily understood by those skilled in the art that rendering of islands, avatars, objects and the like is perhaps the most processing intensive aspect of a virtual universe as well as being the most time-critical for performance which is acceptable to the user. Hardware, software and firmware for performing rendering is generally resident in each VU server 10 and the virtual universe server 115 of FIG. 1 but may be present to some degree (e.g. a graphics co-processor) at a client terminal 120 as depicted by dashed line 210 and parentheses in FIG. 2. In general, the servers 110, 115 will have the capability of arbitrating the most convenient/available location for rendering to be done most expeditiously. For example, when rendering is required at, for example, client 120*a* for interaction of a particular avatar with an object while changing location on an island, the rendering (including occlusion or hidden line processing) could be performed at the local server 110*b* or distributed over any or all of servers 110*a*-110*d* and possibly even including some client terminals (e.g. 120*b*) having rendering capability depending on rendering complexity (e.g. required detail) and current processing loads of VU servers and clients. It should be appreciated that plural avatars for plural residents/users may be present in the same environment and that a different point of view may be required for the rendering presented to each resident/user.

Thus, the graphics to be presented to a user may be transmitted as a rendering to the network or a local client from a server (e.g. as primitives and geometric coordinates or even compressed video or graphics primitives which may or may not be further modified at a local server or client processor) or, if rendering of avatars, objects or islands resident on a particular server are to be rendered on another processor, attributes such as the identity, physical laws, graphics definitions (e.g. primitives), etc. of an island, the identity, properties, graphics definitions, etc. of an object and/or personality, ratings, graphics definitions, etc. of an avatar are stored, preferably as metadata in servers 110 and/or VU server 115 and transmitted as such to the processor(s) which will actually perform the rendering and retransmission of the graphics. It should be appreciated that such attributes will be either constant or only infrequently or slowly changing and thus would be impractical and distracting to specify with each avatar command but can be automatically transmitted and retransmitted between servers, as needed, with avatar commands, controls and/or communications specified by the user/resident.

It should be appreciated that client 120 will have appropriate controls and communications facilities (which are not generally hardware-dependent but can use available hardware interfaces such as a keyboard, mouse, camera, microphone or the like) collectively depicted at 225 of FIG. 2 which will preferably be resident on the client processor. In order to create islands, objects and avatars, some arrangement for doing so, preferably a graphic user interface (GUI) which may be in the form of one or more screens (possibly nested) functioning as a console 230*a*-230*c* may also be resident but are preferably downloaded from virtual universe server 115 through the local server. Such consoles allow particular attributes (e.g. locations, properties, personalities, graphics definitions and the like) to be specified and which are thereafter stored, preferably on an associated server 110 as depicted at 220*a*, 220*b* and 220*c* for islands, objects and avatars, respectively. Similar GUIs 240*a*-240*c* are also provided (but preferably resident on the client processor) for control of the current island, object and/or avatar, once it has been created. Suitable arrangements for providing GUIs or consoles 230*a*-230*c* and GUIs 240*a*-240*c* are known and others providing enhanced user/resident conveniences are foreseeable. The current island (220*a*) with its associated objects (220*b*) correspond to the current location of the current avatar (220*c*); allowing the avatar to interact therewith including placing objects belonging to the avatar into the landscape of the current island.

Some definitions which will be helpful in the following discussion are:

1. Avatar—an avatar is a graphical representation the user/resident selects that others can see, often taking the form of a cartoon-like human but which can be produced with any degree of detail, whether realistic or fanciful;

2. Agent—an agent is the user's account, upon which the user/resident can build an avatar and which is tied to an inventory of assets the user creates and/or owns;

3. Region—a region is a virtual area of land (e.g. a portion of an island or an environment associated therewith, such as an interior space in a building) within the virtual universe which typically resides on a single server;

4. Landmarks—a landmark is a map location that can be saved by a user (much in the manner of a "bookmark" in the Internet) and typically comprises a name and a map coordinate within the VU;

5. Friend/contact—a friend or contact is another user/resident of the VU which is maintained in one or more lists which allows a user to see when friends or prior contacts are online and provides a mechanism for contacting them directly using tools available with the list. It should also be appreciated that assets, avatars, the environment corresponding to a location and anything else visible in the virtual environment comprises universal unique identifiers (UUIDs) tied to geometric data (preferably distributed to users as textual coordinates), textures (preferably distributed to users as graphics files such as JPEG 2000 files) and effects data (preferably rendered by the user's client according to the user's preferences and user's device capabilities but could be otherwise rendered as discussed above).

It should also be appreciated that the properties, characteristics and behaviors of objects, avatars and islands, once created and made part of a VU, are, thereafter, intrinsic to the object, avatar or island and seldom changed although such change is possible. It may be useful to visualize the environment of the invention as providing for additional properties and behaviors of both objects and avatars (and, potentially, even islands) which are not intrinsic, as such, but may be broader in scope, more or less persistent and definable, at will, by the user/resident or a corresponding avatar which owns or is responsible for them. Such additional designated properties and behaviors, hereinafter collectively referred to as designations, are expected to be and have been found to be substantial enhancements to the interactions of avatars with the items and each other which are supported by known virtual universes. More specifically, the present invention provides for yet further enhancements of the virtual universe experience, as well as facilitating the administration of a virtual universe and providing deterrence to misuse of a virtual universe or undesirable behaviors of avatars therein by allowing logical operations to be performed in regard to some designations thus provided.

Figure 3:
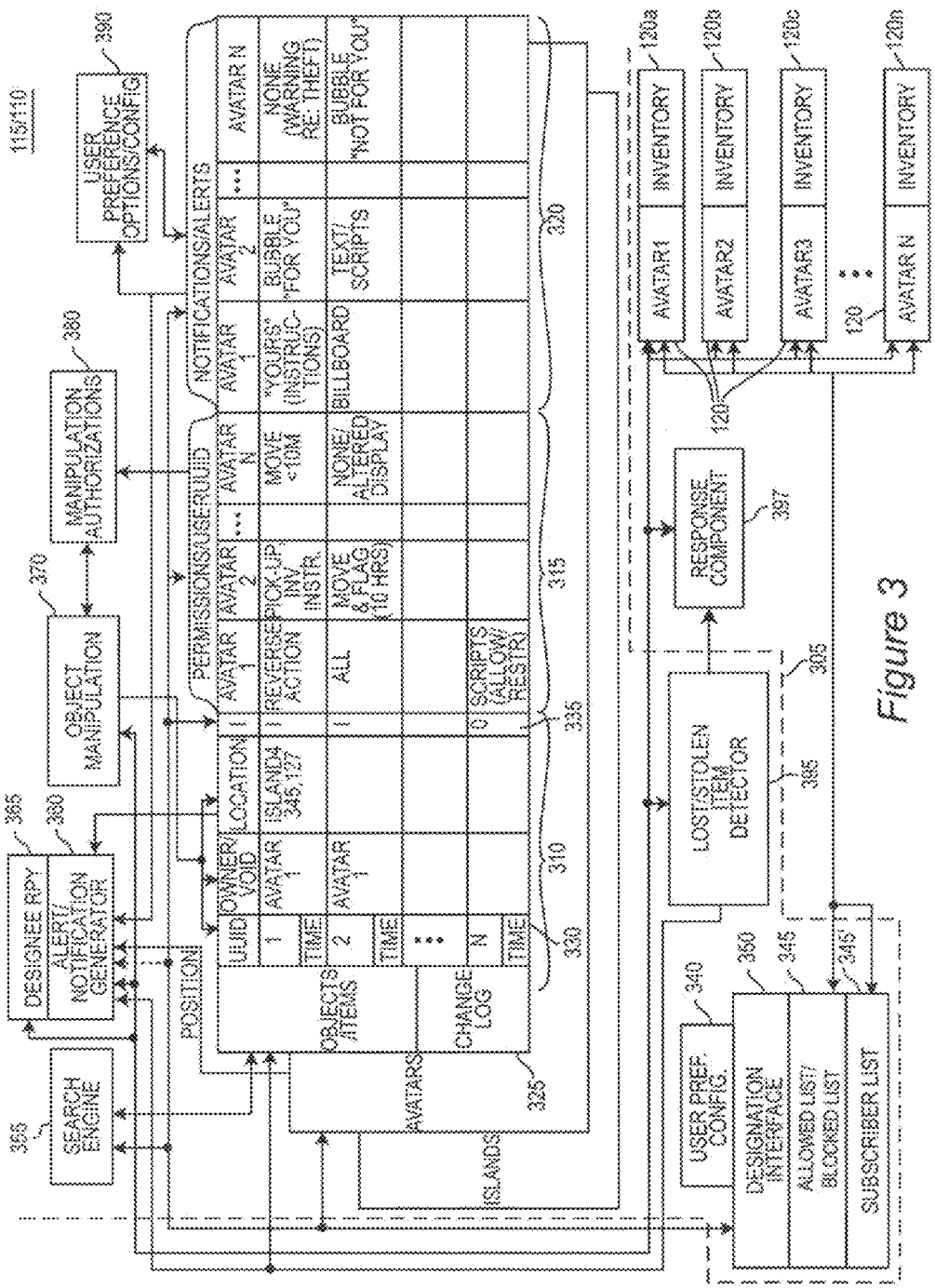
FIG. 3 is a high-level block diagram of a preferred processing architecture suitable for carrying out the invention but may also be understood as a data flow diagram of the present invention.

The invention further enhances and largely operates upon the provision for storage, processing and administration of these additional designated properties and behaviors of objects, avatars and even islands. An exemplary architecture for making and storing such designations and including a lost/stolen item detector 395 and a response component 397 is illustrated in FIG. 3. It should be understood that many of the functional elements depicted in FIG. 3 represent a preferred environment for the present invention in which designations providing substantial flexibility and a degree of protection for items which may be left in a landscape and which provides a significant enhancement of the experience of using a VU. The present invention can be implemented in combination with such an environment very simply and using a minimum of additional hardware and/or software. However, it is to be understood that the present invention can be successfully practiced without such an environment using only a relatively small amount of additional memory which may, in fact, be configurable from available resources in the servers and client terminals illustrated in FIG. 1. The principal elements of interest in regard to the practice of the present invention are the UUID, ownership, location and intentionality tag fields of designation memory 305, notification/alert generator 360 and the lost/stolen item detector 395 and response component 397 and, optionally but preferably, change log 325.

The constituent elements of the architecture of FIG. 3 may be conveniently provided in the virtual universe server 115 but may be divided between virtual universe server 115 and a VU server such as 110b. While some marginally additional processing and communications may be required, provision of the designation storage 305 in a VU server (e.g. 110b) local to the particular user as illustrated in FIG. 2 with mirrored and synchronized storage at virtual universe server 115 and distribution of processing as may be most convenient may be the most nearly ideal implementation but is not necessary to the successful practice of the invention in accordance with its most basic principles.

Central to the architecture of FIG. 3 is designation storage 305. This storage may be of any desired construction or configuration but is preferably content addressable. A "flat" organization is suitable for practice of the invention and is so illustrated in regard to objects for clarity but with similar "planes" for avatars and islands for generality but other organizations may be preferable in some implementations. (It should be understood that in the following discussion, references to an "object" or "objects" is equally applicable to an avatar or island in a respective plane if a designation of an avatar or island has been made.) Alternatively, a plane could be provided for "items" including both objects and avatars for which another avatar is responsible and a second plane for miscellaneous designations such as a region where different physical laws might apply for particular avatars. (Essentially, as illustrated, each plane of designations is a large matrix or database table(s) with objects in rows and particular designation information in columns. For clarity, the designation information is grouped into three categories of information indicated by brackets 310, 315 and 320 and a change log 325. Change log 325 can be implemented in many ways including a modification of the VU database but preferably is arranged to provide for persistence of metadata of items, including at least some of their designations, in a list or other form even if the item is removed from inventory or by proximity (or lack thereof) to an avatar.

Group 310 is basically metadata concerning the items for which a designation has been provided including, for each item, its UUID, the owner (or person responsible for the item, hereinafter collectively included within the term "owner") and its current location. This information basically mirrors metadata maintained, for example, in VU server 110 as described above for objects/items for which designations have been made. Ownership may be relinquished either absolutely or for a period of time by voiding the ownership field or flagging the ownership field as alterable (e.g. by an arbitrary avatar including the original owner) as may be appropriate to the intentions of the original owner. In addition, it is preferable to provide for storage of a time 330, such as an expiration time, associated with the designation and an intentionality flag 335 to indicate if the current location of the object, if different from the location of the avatar which owns or is responsible for the object, is intentional or not. The intentionality flag or tag can thus assist in the determination of whether or not an object is lost or has been stolen, as distinct from being intentionally left behind when the avatar changes location such as where an avatar may wish to leave an object at a location to observe interaction of other avatars therewith but to recover the object at a later time or automatically at a particular time 330.

Group 315 is designation information specified by the owner in regard to particular restrictions imposed or permissions granted in regard to the object/item for particular avatars or groups thereof (e.g. default restrictions for avatars for which a designation is not specified, an allowed list or blocked list of avatars or the like). In general, a designation will be made for only one avatar or group or a small plurality thereof with other avatars having a common default or other basic group of permissions and restrictions. (Such default or basic group of permissions and prohibitions may be specified by a user/resident but it is preferable that at least one basic default set of permissions and prohibitions be provided as an administrative preference. For that reason, it is immaterial whether a default is deemed to be invoked by an absence of designated permissions and prohibitions or as a designated set of permissions and/or prohibitions for avatars for which no other permissions or prohibitions are affirmatively set by a user/resident.) For example, the owning avatar may designate that only certain friends may even see the object/item. In general, permissions and restrictions may include (without restriction) any or all of reversing the designation, limitation of distances or a duration during which an object can be moved, whether or not a display of the object can be altered and scripts which may or may not be allowed to be run in regard to the object such as for animation or morphing of the object.

Group 320 is a similar array of designation information but in regard to the mode and language of notifications in regard to an object for which a designation has been made. In general. such information will indicate a preferred or specific form of notification (e.g. a bubble, hovering sign, nearby billboard or the like) including conditions (e.g. proximity, time, log on/log off or the like) under which the notification is to be made, an indication of permissions and/or restrictions, instructions for the designated avatar to follow, warnings regarding theft, designated or intended ownership and the like.

Thus, in the form illustrated in FIG. 3, a row of designation memory 305 forms a metadata identifier for an item which specifies, in addition to other metadata of that item, its UUID, its ownership (if any), its current location (e.g. where it is dropped or the location to which it may be moved thereafter), including an intentionality flag, I, and permissions/restrictions and notification methods and language for respective individual avatars or groups of avatars with any desired degree of granularity or specificity as well as information to be delivered with either notifications/alerts or permissions. Additionally such a unique identifier, regardless of how it is configured, can provide for expiration of a designation at a given time or after a given duration and the specification of actions that will occur upon such expiration. For example, if, as illustrated in FIG. 3, avatar 1 owns an object with UUID=1 with an intentionality flag I=1 and "reverse action" being specified as a permission for avatar 1, upon expiration of the designation, the dropping of the item and its corresponding designations will be voided and the item returned to the inventory of avatar 1 while before expiration of the designation, avatar 1 has the permission to take the same action manually. Further, by accessing the item through the UUID in the metadata identifier, changes in the location or any other permitted changes to metadata of the item may be tracked through entries in change log 325.

A change log 325 is also preferably provided to track and time stamp changes in the stored designations in order to, for example, return items to the owners or previous owners inventory upon expiration of the designation. In particular connection with the present invention, change log 325 will also document any interactions with an object which violate the permissions and restrictions designated and stored in memory 305. Comparison is thus possible between a current inventory for an avatar and changes in that inventory or even a prior version of an inventory that may thus be reconstructed to allow a user to verify that an item is, indeed, missing rather than merely relying on personal memory. The change log is also important to functions of reversing a designation, altering a designation by a designee if permitted by the designating user, declining of a designation by a designee, taking remedial action for vandalism (e.g. allowing a damaged or destroyed item to be restored), discriminating lost or stolen objects and the like.

More generally, the preferred embodiment of the present invention employs relational tables to constitute designation memory 305 for performance and organization reasons. A field may contain different data for different users to allow an item's owner to establish granular permission on a designated-user basis or on an all-user basis. As a result, one permission set (and therefore one record or record series in the database) is established for User A/avatar 1, while another permission set may be established for User B/avatar 2 and, perhaps, a different permission set may be established for all other users (e.g. avatar N). In the preferred embodiment, if a designated item does not have an all-user permission set, then only designated users will be eligible to pick up or otherwise interact with the designated item. Conversely, an interaction by an avatar contrary to a permission can also be detected or at least documented.

A table or equivalent storage area (such as additional fields in an existing table) is made available to store an item's designation information. This table should contain at least the following fields as are depicted in FIG. 3 as described above:

A field to store the identifier of the item.
The identifier of each designated user or users.
The identifier of the owning user (unless already available by a join to an existing table based on the identifier of the item).

Additional fields may be made available to provide additional functionality, including (as depicted in FIG. 3 and described above), but not limited to:

Location coordinates of where the item was originally left by the user.
A time stamp of when the item was left (e.g. a change log).
Text field(s) for the user to give a description or instructions or use in indication of an alarm condition.
Text field(s) for the user to include words that will appear on a sign above the asset (and may be granular such as different text that will be visible to different users).
A distance from origin coordinates where the item may be moved.
A time duration from pick up to put down.
identifier(s) of any scripts associated with the item to be allowed or restricted.
Notification options, which may be restricted or otherwise overridden by designated user's preferences.
A time stamp at which point the designation will expire.

Any of the foregoing fields may be implemented in a single flat table or split into relational tables such as memory 305 as discussed above.

Some of the fields identified above may be established automatically based on a user or administrator's established preferences, which may be stored in another database table 340 such as an addition to a user's preferences, or some or all preferences may be stored in a database or configurations file local to the user's Virtual Universe Client. Such preferences may or may not be enforced and may or may not be editable by a user, which could include preferences established by an administrator.

Returning to FIG. 3, the operation and use of designation memory 305 will now be discussed. It is assumed for purposes of the following discussion that avatar 1 through avatar n 120 correspond to different users and at least some are currently active and controlled from different client terminals 120a-120n and corresponding inventories belonging to respective avatars suitably stored in connection therewith. It is further assumed for purposes of this discussion that avatar 1 will leave an item in a location in a VU designated unconditionally for avatar 2 and, conditionally, for avatar 3, but to the exclusion of other avatars.

To designate an item, avatar 1 transmits a message indicating a desire to do so which is, in effect, a request for an interface for making entries in fields of designation memory 305 such as those described above. This request and the user identification of the user may be checked against a blocked list which indicates users who are prohibited from designating items and/or a subscriber list (e.g. allowed list) 350 of persons who are registered to receive the designation service provided by the invention. In this regard, it is preferred that the operational aspects of the invention are preferably embodied as software, portions of which can be downloaded to configure servers and client terminals as may be needed to provide additional memory fields and various functional elements which will be described below. Thus, the function of downloading the software to be used by a VU resident provides a convenient basis for administration of use of the invention and the assessment of charges for its use.

Assuming that the user is allowed to use the invention, a designation interface is configured in accordance with user preferences stored at 340 and an interface of the desired configuration (which configuration is not important to the successful practice of the invention) is built at 350 and transmitted to the client terminal associated with avatar 1 and access is provided to search engine 355. Search engine 355 will then conduct a search to find the storage location for the inventory of avatar 1, if necessary (e.g. if the inventory is not stored in direct association with avatar 1). Wherever stored or found, the inventory is then loaded, for example, into a menu of the interface from which the resident associated with avatar 1 can select. When a selection is made, the UUID and other metadata of the object or dependent avatar (or possibly island) is located and loaded into the UUID column of memory 305. The current registered owner is then loaded into the second column of memory 305. The metadata will also include the current location in the VU (and preferably an identification of the VU for extension of the invention to multiple virtual universes) of the selected item which can be stored in the third column of memory 305. However, it should be noted in this regard that since avatar 1 is active in the VU and owns (or is otherwise responsible for) the item, avatar 1 can move the item freely in the VU and the location stored in the third column of memory 305 will be changed accordingly when the designation is completed and entered or applied (e.g. stored without taking action). The time-out or expiration time or duration 330 can be entered and stored in memory 305. The action to be taken in accordance with the designation being made and the action to be taken upon time-out may then be selected. The intentionality flag, if provided, may also be set at any point during the designation process. This completes data entry for the data fields of group 310 of memory 305.

Fields in groups 315 and 320 can then be populated in respective columns of the row corresponding to the object being designated. Specifically, a user will be selected, preferably in accordance with a list of avatars specified as friends. Search engine 355 can be used as necessary to obtain needed data (e.g. the avatar's identification or UUID or the like) in accordance with selections made. One or more actions that the selected avatar is permitted to perform in regard to the item being designated and any limitations/prohibitions thereon can then be selected, and the combinations of actions and limitations are stored in the column of group 315 of memory 305 corresponding to the selected avatar. In this case and under the above assumptions, avatar. 2 would have permissions to pick up the object, move it, run associated scripts, add it to its own inventory, if desired, or reject the designation, etc. and instructions such as text could be provided, as well. Also under the above assumptions, avatar 3 might be granted permissions to pick up the object but not move it, manipulate it, run scripts, etc. In this regard, any permission or group of permissions could be alternatively entered as a prohibition as may be convenient.

Similarly, for the currently selected avatar, the preferred method of providing notification to the designee avatar may be specified such as providing a floating sign or bubble when the designated avatar is within a specified distance of the item. However, it is preferred to also accommodate preferences of the designee avatar in regard to notifications; which preferences are stored at memory 390. It is contemplated that either the stored preferences be used to populate the interface from which the designating resident/user can select or, alternatively, to allow the designating resident/user to select from a full range of possible notification mechanisms (e.g. bubbles, billboards, floating signs, log-in or other event-responsive notifications, e-mail outside the VU, and the like and compare the selections designated with the user preferences when corresponding notification conditions are met to omit, modify or select from among the notification mechanism(s) preferred by the designee in order to configure the notification mechanism(s) actually used. It is preferred that provision be made for the text of a notification to be freely specified by the designating user/resident since the notification, conceptually, is an invitation for the designee to use or interact with the item. For example, scripts that may be executed in regard to an item may be particularly interesting to a particular designee and the ability to refer to them in the notification may increase the likelihood of designee interaction with the item at an early opportunity.

Once the permissions/prohibitions and notifications entries have been made for the selected avatar, those entries can be entered or applied (e.g. by actuating buttons on the interface, another avatar selected for designation and the process repeated for another avatar. All avatars for which a designation is not made are preferably treated as having default designations with minimal or no permissions and with notifications, if any, being limited to standard theft warnings, "not for you" bubbles, signs or billboards and the like. The completion of the designation may be indicated to the system by closing the interface after entering the designation. If the designation specified is merely applied, selections made and editing performed to date are merely stored and can be retrieved for further editing at another time. The intentionality flag can be set to I=0 or a similar flag used to indicate that the designation is only applied and that no action is to be taken upon the applied designation.

Now, assuming that avatar 2 and avatar 3 are active on the VU when the designation is completed or at some time thereafter, their activity will be known to the VU system and a notification will be generated in a form most nearly matching the preferences of both the designating user/resident and the designee by alert/notification generator 360. Some mechanism for allowing the designee to reply or at least generate an acknowledgment when the notification is received is preferably provided as indicated at 365 of FIG. 3.

It should be understood that inclusion of the present invention in a VU system does not alter the interaction of any avatar with the remainder of the VU system. That is, while a user/resident may be checked against an allowed list/blocked list or subscriber list much in the manner described above in regard to lists 345, 345', the lists against which a potential designee user may be checked may be different lists of authorized or prohibited users of the VU, in general, and not necessarily authorized or prohibited users of the present system if it is desired to allow for designation to any participant in the VU. On the other hand, it may be desirable to require a subscription and fee in order to have the ability to have a designation made to a particular VU user/resident and/or to receive notifications thereof, in which case, the user/resident, would be checked against a subscriber list such as lists 345, 345', as well.

When an avatar of a user/resident (not necessarily a designated avatar, other than by default) is in the vicinity of a designated object, as is necessarily known by the VU system, notifications may be made as alluded to above. If the avatar then seeks to interact with a designated item, commands for such interaction are then filtered against permissions stored for the respective avatar as stored in group 315 of memory 305. To improve response speed, it is considered to be preferable to load permissions from memory 305 to a buffer or cache storage 380 or the like based upon avatar proximity to the designated item. Thus data for comparison with avatar commands will be available when an avatar command is issued by the corresponding user/resident. If the commanded interaction is not permitted (and assuming this arrangement has not been circumvented in some way), the command is not performed and the user/resident associated with the avatar preferably informed of the lack of permission for the interaction. If the commanded interaction is permitted, the interaction may be immediately performed. Thus, since the designating user/resident may grant any permission including the permission for a designated avatar or a plurality of designated avatars to add the item to the designated avatar's own inventory while prohibiting other avatars from doing so, direct, contemporaneous contact between avatars at a given location is not necessary for exchange of items between avatars as is required in known VU systems. By the same token, if the item is not transferred to the inventory of another avatar, the designating avatar can recover (e.g. pick-up) the item and return it to the original inventory or even provide for the item to be automatically returned (e.g. after time-out of the designation). Further, if a designated avatar is allowed to move an item from the location it was dropped by a designating avatar or otherwise manipulate it or change its properties, behaviors or characteristics but not add the item to the designated avatar's inventory, the designating avatar or its corresponding user/resident can track the location and or state of the item through the UUID of the item using search engine 355, Moreover, the ability to drop an item at a location to allow and, indeed, invite (through a notification which can be periodically repeated, as desired) another avatar to interact with it at a convenient later time much more closely simulates real world capabilities and thus enriches the VU experience while encouraging relationships among avatars and their corresponding users/residents.

Thus, in summary and prior to discussing particulars of preferred processing for detection, location, issuing of alerts and remediation of lost, stolen, vandalized or destroyed items, known VU systems generally support ownership of items by avatars and the interaction of avatars with objects, islands and other avatars. However, transfers of ownership are generally only supported by a transfer between avatars in a "face-to-face" transaction with both avatars in proximity of each other at a given time. Items may be left on a landscape by an avatar, and may thus be even more likely to become lost or used improperly by other avatars while the "lost-and-found" functions of known virtual universes, if provided at all, are very limited and generally cannot be invoked in the same VU session in which an item was lost. Therefore, in general, a lost item cannot be recovered except after a substantial delay or closing and re-opening of a VU session or by a generally inefficient, time-consuming and often unsuccessful or at least inefficient manual search.

The additional provision for designations to be made in regard to items (which is not a facility of known VU systems) allows much increased flexibility for transfer of ownership of items and interactions of other avatars with items while providing a degree or selectivity and protection for the item; allowing items to be intentionally left on a landscape with certain permissions granted to particular avatars for use or transfer of ownership and notifications to be made to other avatars that such action has been taken. However, such designations may tend to increase the likelihood of items being left on a landscape and, moreover, may complicate manual or automated searches for items which are actually lost or stolen and which may be vandalized or destroyed. The present invention is particularly directed to provide for tracking, discovery and remediation of lost or stolen items and deterrence of actions by avatars that may compromise ownership of items or otherwise represent undesired behaviors as will be discussed below in connection with FIGS. 4A and 4B.

Thus, by providing for additional and persistent storage for ownership and designation attributes of items including an intentionality flag or the like, the VU is able to tag items in a manner that also can be exploited to avoid confusion between Virtual Universe items that are lost or stolen and Virtual Universe items intentionally left on the landscape with which other users may interact in accordance with designations/ permissions as is exploited by the present invention. For this reason, the provision for designations in a VU in the manner described above is very much preferred as an environment for the present invention since it allows the present invention to be implemented with a minimum of additional hardware and/ or software while leveraging the environment which provides substantial enhancements to the VU experience to provide yet further desirable functions and facilities. However, it should be understood that provision for designations in the manner described above is unnecessary to the successful practice of the invention to locate missing items, facilitate administration of items in the virtual universe or across multiple virtual universes and to facilitate recovery of items determined to be lost or stolen. All that is necessary is the provision of minimal persistent memory making it possible for intentionally-left items to receive tags that are distinguishable from tags received by items that have not been intentionally left, a search engine capable of efficiently searching selected fields of such persistent storage and discriminating data which can confirm if an item is lost or stolen (depicted at 405 in FIG. 4A) and some form of processing for remediation depicted at 406 in FIG. 4A (which is also preferably included in the preferred environment which provides for notifications to be made).

For example, a tag on an intentionally-left item could include a description of the item as part of the tag, while such a description might not be needed for a tag intended primarily to locate an item if it is lost of stolen. That is, while an intentionality flag, I, is preferred and considered a convenience supporting increased searching speed in many circumstances, intentionality can be discriminated in other ways based on other persistently stored information, such as ownership information, lack of designations or other data characteristics.

As noted above, some Virtual Universes lack the ability to store the necessary ownership information, and it would be difficult to implement the foregoing steps in such Virtual Universes. In such cases, however, other mechanisms, such as a memory persistently storing only some of the information described above in connection with designation memory 305 including at least ownership information mapped to the UUID of some items and an intentionality tag or other information from which intentionality can be determined is adequate to the successful practice of the invention for detection of missing, lost or stolen items. Based on such information, the VU system can perform a rapidly executed scanning operation to discriminate items which are missing, lost, stolen, moved, vandalized, destroyed or the like whereupon some form of remediation can be initiated as will now be discussed.

As discussed above, the present invention enables the embedding of ownership information in any geometric or software item, or items that consist of both geometry information and software. For example, a clothing item or sculpture may have identifying metadata that may be used to map the item to an owner. Additionally, the metadata may contain information that indicates that an item has intentionally been deposited in the landscape or in a building. For example, I=1 if the user has intentionally deposited the item, and I=0 if the user has not. The value of I may be set in many ways, for example, by a user using a graphical user interface and clicking on the item. Note also that metadata may contain a Virtual Universe identifier. Each Virtual Universe participating in this interface may have an identifier. Thus, an item may contain metadata such as, without limitation: Universe ID (in a Multiple Virtual Universe Context and which may be included in or inferred from the UUID of the item as shown in FIG. 3); Owner ID; and Intentionality Flag.

The following is a high-level description of steps employed by the present invention to implement an ownership tag and facilitate the return of an item to a user:

Ownership information is embedded in an item as a unique identifier as described above This can be done regardless of the nature of the item, which could be, e.g., a geometric item, a software item, or an item that comprises both geometry information and software For example, a clothing item or sculpture item may have identifying metadata that could be used to map the item to the user who owns it. Additional metadata might be employed to indicate, e.g., that an item has been intentionally in its current location.

A user may request that the Virtual Universe perform a search for an item believed to be missing by, for example, requesting an alert either directly or through the VU administrator.

A search may be conducted by scanning the Virtual Universe for item's ownership identifier as will be discussed in connection with FIGS. 4A-4C below.

For example, a Virtual Universe could run periodic automated scans to check tagged items against a list of missing items.

When a missing item is located, it may removed from its current location and placed in the user's inventory or other action taken such as issuing an alert or a notification to the owner of the item.

A notification, or alert, of a lost or stolen item can be provided to interested parties (such as: registered users within a certain proximity to the missing item(s); other registered users within the a Virtual Universe or Multiple Virtual Universes; or an administrator of the Virtual Universe). Such notifications or alerts may be readily provided with little additional hardware requirements if done in combination with a designation memory arrangement as described above, as is preferred since alerts can be generated in the same manner as notifications of designations at alert/notification generator 360 as described above. In general, alerts will differ from notifications described above principally in the text they are to contain and the users to whom they are delivered; both of which can be directly input by the user or administrator initiating the alert or simply parsed from the content of an alert request or the alert, itself. That is, providing such notifications or alerts involves the following high-level steps:

Detecting a lost or stolen item in a Virtual Universe, performed by lost/stolen item detector 395, and Responding to the detection, performed by response component 397 which basically controls issuing alerts, generally through notification/alerts generator 360, or automating a recovery mechanism by data transfer from a memory to the inventory of the owner which may or may not include issuance of an alert or notification.

Specifically, a lost/stolen item detector 395 is depicted in FIG. 3. A suitable architecture for a lost/stolen item detector is illustrated in FIG. 4A and a preferred mode of operation thereof is illustrated in FIG. 4B. A preferred implementation for lost/stolen item detector 395 is essentially a specially adapted search engine which is preferably optimized for selection of one or more fields of memory or relational storage and scanning through selected fields corresponding to respective items stored for particular values stored in the selected fields. Such an organization facilitates both a periodic, event-related or administrator-initiated search for items which have particular designations and/or changes logged which may be consistent with being lost or stolen as well as searches for particular items input by a user as thought to be lost or stolen as depicted at 404. The ability to select fields also generally can reduce processing by eliminating large numbers of objects from the search beyond an initial scanning.

For example, while other procedures may be appropriate for particular circumstances, it is generally desirable to scan through all UUIDs of objects in a virtual universe which have a current intentionality flag with a value of I=0. That is, if I=1 and that designation has not timed out (e.g. the intentionality flag designation expired due to time 330 being exceeded whereupon the intentionality flag may be caused to revert to I=0), it can be assumed that the item is not yet reasonably considered to be lost or stolen. Since items within a virtual universe may be very numerous, such an initial scanning of intentionality tag or flag values can greatly reduce the processing for further evaluation to determine if an item is likely to be lost or stolen.

As another example, a periodic or administrator initiated search might be of a region of the VU. Such a region may represent an environment such as a museum which contains many objects but, in general, should contain very few objects having an ownership indication which does not correspond in some way to the same ultimate owner while intentionality flags or tags may or may not be set or even provided. In such a circumstance, the most efficient initial screening of items may be directed to the ownership field in order to avoid consideration of items which belong in (or to) the landscape. Alternatively, the inventory of the region may be checked against the change log 325 or a previous version of the inventory reconstructed therefrom to determine location changes, vandalism, theft or the like. Other scenarios and search strategies which can limit processing by rapidly eliminating large numbers of items from the search under particular circumstances will be evident to those skilled in the art and can easily be implemented in a similar fashion by allowing selection of fields to be searched for particular values using relational tables or other content-addressable storage structures.

Thus, an important capability of field selector/scanner 401 is to be able to access selected fields in designation memory 305 and retrieve a limited number of items and selected fields of metadata associated with each retrieved item which is facilitated by selection of one or more fields 411 and scanning items for a particular value being stored in the selected field as illustrated at 412. Other fields including fields of the change log 325 may then be evaluated for particular combinations of values in a filtering process 413 in filter 402 to develop a list 403 of lost or stolen items.

Figure 4C:
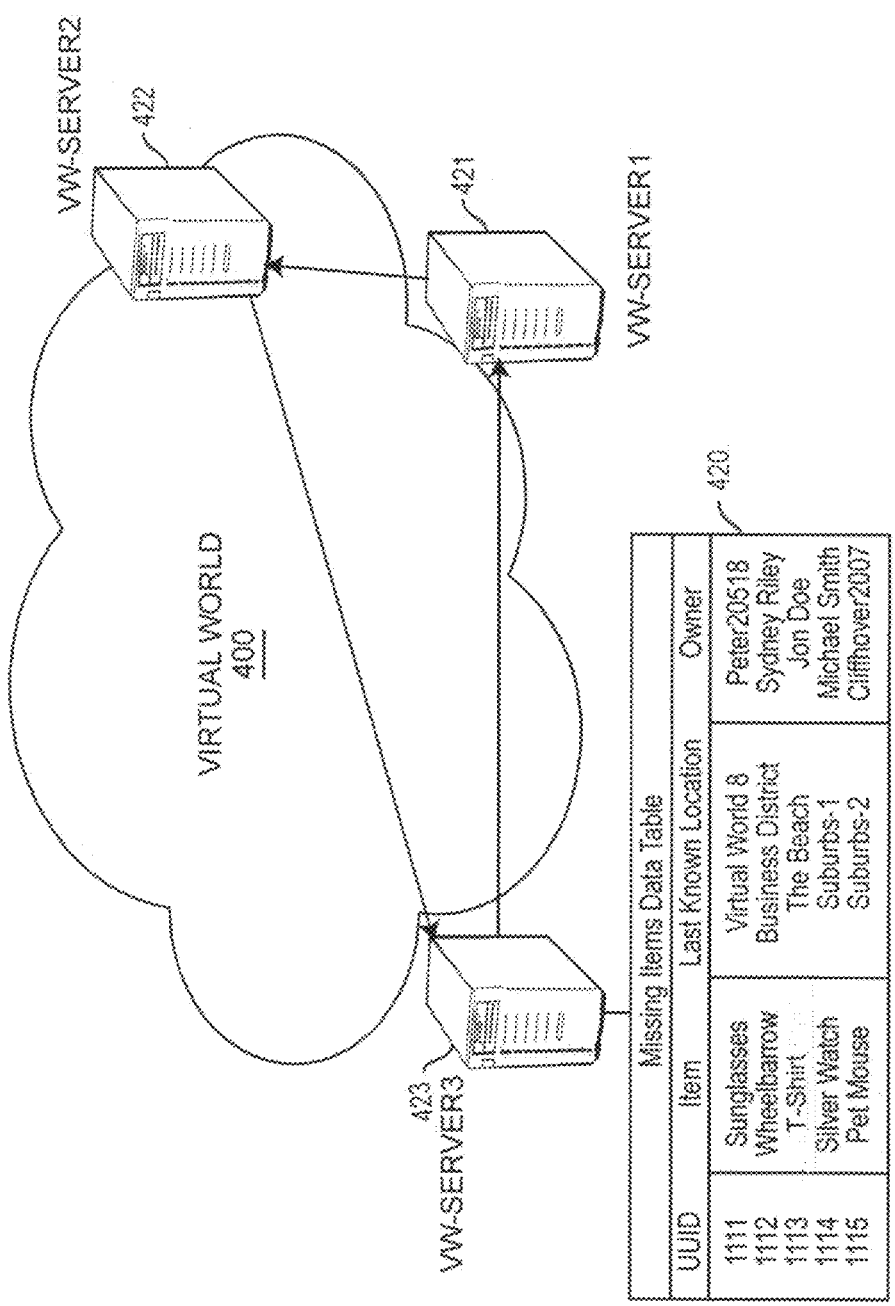
FIG. 4C shows a virtual universe hosted on a server with clients and a missing items data table.

Thus, referring to FIG. 4C, there is shown a high-level overview of a virtual universe 400 hosted on a server (VW-Server 2) 422 with the inclusion of the invention. Upon discovery that a user within the virtual universe is without an item, the server (VW-Server 2) 422 will contact another server (VW-Server 3) 423 having access to a database hosting a Missing Items Data Table 420, to help identify the missing item. When the missing items are located, server VW-Server 3 will contact the other servers 421, 422 to enable the user to regain possession of the missing item.

More generally, a unique identifier is detected via a scan process. If a resident believes that an item is missing from his inventory, he may request a Virtual Universe-wide recall or recall across different Virtual Universes who have agreed to use a standard interface. Such a request may be initiated directly but is preferably performed by sending a message to the VU administrator who would then issue the alert and/or initiate a search and possibly take other action if deemed appropriate for maintaining the condition of the VU system. That is, an administrator could detect some pattern in requests that might indicate an ability to resolve a plurality of missing item issues that are due to a hardware or software failure or the like. The alerts may also be implemented to allow users in a Virtual Universe to alert the Virtual Universe administrators that a plurality of items are missing and that the Virtual Universe administrators may need to take action.

Alternatively, the Virtual Universe may do such scans in an automated fashion, while omitting items with I=1 from the scan. If a user is aware of the specific Virtual Universe in which he has likely lost an item, he or she may initiate a scan that is restricted to that Virtual Universe according to its Universe ID (potentially useful, for example, in a Multiple Virtual Universe environment). When a missing item is found, it is removed from its current location and placed in the owner/user's inventory or other remedial action taken as determined by preferences or instructions stored at response component 397. An owner may also query or sort all of his or her items according to the value of I and by Universe ID. Note also that the use of an Intentionality Flag may lead to a richer communal and collaborative building experience not easy in current Virtual Universes.

An item may also be declared lost or stolen by one or more of the following techniques:

A declaration by the user/owner that an item is missing. This may be done, for example, by selecting a lost item from a list of prior inventory or items or a list of related avatars, such as family members, authorized to use the item. Providing this capability may require a modification to the Virtual Universe database wherein items may persist in a list even if removed from inventory, or avatars removed by proximity to the user such as by the function of change log 325 described above which supports the reconstruction of an inventory from a history of transactions and changes in metadata stored in memory 305 or the like.

A declaration by a user other than the user/owner that an item appears to be out of place. This may be done, for example, by enabling a user encountering an item that appears to be out of place to select the item, such as clicking on it, and forward the item's identifier (e.g., UUID or other identifier) to the Virtual Universe grid, at which point it could be determined lost or stolen.

In addition, an automated determination of an item as lost or stolen may be made by one or more of the following techniques:

A Virtual Universe determination that an item has been outside of a user's inventory for more than a specified period of time. The period of time may be determined on the basis of, for example, a user setting or an administrator setting.

A Virtual Universe determination that an item is beyond the range of a user. The determination of a user's range may be made on the basis of, for example, a user setting or an administrator setting.

A Virtual Universe determination that an item was left outside of a user's inventory and then retrieved by another user. The determination of the item being lost or stolen or not would then be made, for example, by filtering to compare the object manipulation 370 with the permissions (or prohibitions) designated 380 for the avatar performing such manipulations.

Once an item is detected as being lost/stolen, its UUID or other identifier is placed as a new record in the Virtual Universe database in a new Missing Items Table 414, which is used to store data pertaining to lost or stolen items. A new record entered into the Missing Items Table invokes the Detection Response Component 397 as will be described below. Any subsequent actions on the item such as described above may be added to the record or otherwise stored in the database (e.g. change log 325) to maintain a history and current status of the item.

Once a record in the Missing items Table is created, the detection response component 397 is invoked to respond to the detection. Such a system can facilitate the alert and recovery of missing items by alerting users and administrators through a notification system or by returning the item to inventory from other storage such as field group 310 of memory 305 or change log 325 (depending on whether or not "reconstruction" of the item is required due to being vandalized or destroyed) or even from the inventory of another avatar (if the item has been stolen). Response component 397 is basically storage and logic to choose between the options of generating an alert/notification 415 by alert/notification generator 360 (e.g. by notifying an owner of the location of the item and/or how to recover it or alerting other avatars of the missing item to seek assistance) and returning an item to the owner's inventory by data transfers between memories. Virtual Universe administrators and other registered users may receive alerts of missing items based on various criteria which may include, without limitation, one or more of the following, preferably specified and stored in preferences memory 390:

Time. Alerts may be given at periodic intervals, such as, e.g., alerts every 5, 10, 30, 60, 120 minutes).

Distance from a missing item event. Alerts, especially (but not exclusively) initial alerts, may be given to users based on proximity to a missing item event, such as alerts for anyone within, e.g., 250 virtual meters of the last location where a missing item was known to have been.

Presence within an alert zone. Alerts may be given to users as they enter a specified alert zone for a missing item. Thus, a user entering an alert zone would receive missing items alerts applicable to that zone, even if the user was not present in the alert zone at the time of the missing item event.

A notification or alert system may be employed by a Virtual Universe to transmit a graphic or text alert message, for example, to users within a certain proximity to the lost or stolen item, to all users (or all registered users), to Virtual Universe administrators, or to other Virtual Universes within a Multiple Virtual Universe configuration. Such a notification system could, for example, send out a message describing the missing item and also provide the ability to contact the sender if the missing item is found. Alternatively, the system could enable the automatic reclaiming of the item. The form of such alerts may be managed based on a combination of the preferences of the owner and the user being notified which are stored at 390 as discussed above. Such alerts may be generated in one or more of the following endpoints, among others:

On screen display: The on screen display for the user's chat window (for example, all virtual users within a certain proximity will receive an on-screen display message).

Billboards: Large billboards or signs may be included (for example, all signs and billboards within 500 meters of the event).

Extra-world systems such as email, SMS, other text to mobile, etcetera. This is enabled by either:

Metadata in the item itself containing the contact method, or

Identifier (e.g., UUID) information could be compared to a look-up table at the sim server level, with the owner's contact information being extrapolated out from that look-up table.

Figure 5A:
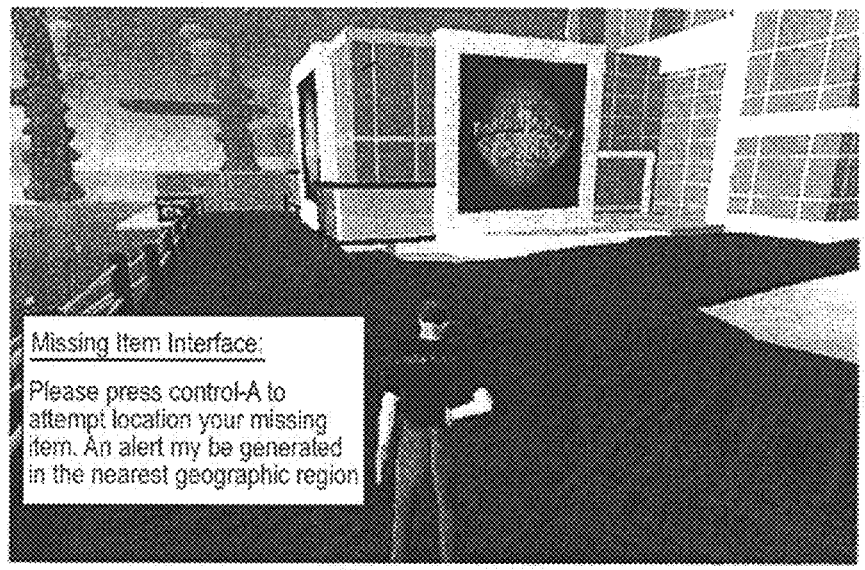
FIGS. 5A, 5B, 5C and 5D show exemplary screens of a user interface in a preferred embodiment of the present invention.

For example, referring now to FIG. 5A, a user, noticing that an item is missing, calls up a Missing Item Interface, which becomes displayed in a text balloon on the user interface. The text balloon instructs a user to press control-A to locate a missing item and states that an alert may be generated in the nearest geographical location of the virtual universe.

Figure 5B:
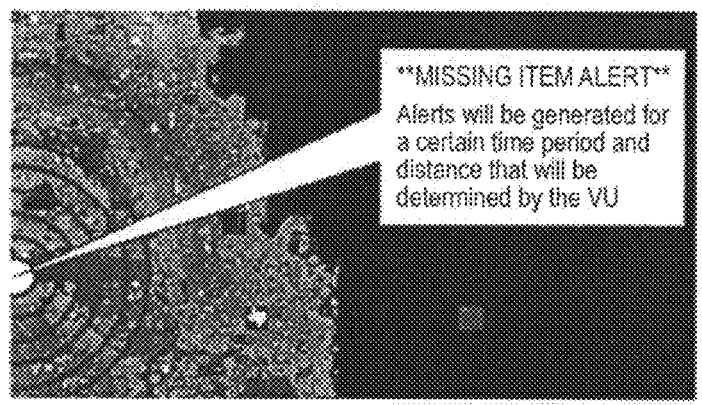

Referring now to FIG. 5B, an alert is sent out based on logical distance from the missing item. A Missing Item Alert is displayed on the user interface with a text balloon instructing the user that alerts will be generated for a certain time period and distance that is to be determined by the virtual universe.

Figure 5C:
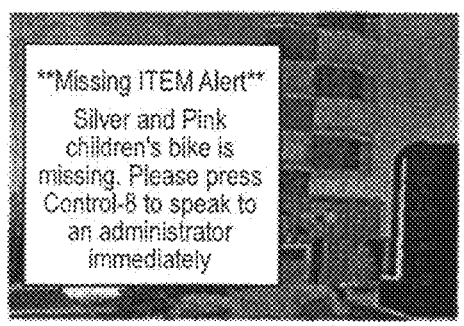
Figure 5D:

Referring now to FIGS. 5C and 5D, different billboards and alerts are displayed in the virtual world. FIG. 5C shows a Missing Item Alert displayed on a user interface of a user terminal, with a text balloon provides the user receiving the alert with a description of the missing item and informing the user as to how to contact a system administrator concerning the item. FIG. 5D shows a Missing Item Alert displayed on a user interface of a user terminal, with a text balloon similar to that shown in FIG. 5C, except that the FIG. 5D text balloon takes up most of the display space of the user interface.

Virtual Universe endpoints for delivery of alerts may comprise users, signs, on-screen displays or any other target to which a message may be sent. Alerts may be sent out (for example, via the Virtual Universe public chatting system) to registered users and the Virtual Universe administrators. Such announcements may be prefaced with a special "Missing Item" or "Stolen Item" code to help differentiate the announcements from standard text chat messages. The message may include a graphic of the item in question along with text describing the item and the circumstances surrounding the items disappearance, as queried from the Missing Items Table.

To help cover large distances, the message may include the use of billboards or large signs near populated areas displaying an alert about the missing item as well as sending out alerts to registered users in the proximity of the missing or stolen items. The message could be displayed on an in-world display, e.g., upon the Virtual Universe client or other related software for anyone whose avatar is currently rendered within a given location.

Such a notification or alert system may also provide a mechanism for managing stolen or vandalized items within a Virtual Universe within a certain radius from where the item was initially stolen or vandalized. If an item is stolen, a description of the item may be given during the notification process to enable the Virtual Universe (or its administrators) to act on the information. Some alerts may be sent to entities within a specific radius in which an item is suspected of being lost. For example, different radii would be appropriate for an expensive device was last used at a known location but is no longer in inventory at a later time during which the avatar has moved or an item has been misplaced in a certain location within the Virtual Universe. These options can also be selected or declined by editing preferences of the owner stored at 390 either directly or using an interface screen arranged for the purpose.

Notification/alert preferences may be set, and thus may permit various levels of granularity, such as: (i) allow or disallow e-mail notification, (ii) notification at log-on, (iii) pop-up alert notification, or (iv) any other form of notification that may be implemented. In addition, notifications may or may not be repeated periodically and may or may not be sent or copied to another user. Any alternative notification convention may be employed.

The graphic rendering of a missing item, examples of which will be discussed below in connection with FIGS. 5A-5D, may or may not be adjusted as part of the notification/ alert process. An item designated as missing might, for example, receive an additional rendering graphic layer, such as a hovering sign above the item pointing toward it with a message like "Missing item" along with additional information from the item's alert. If an item is missing due to being moved, a prior location of the item could be indicated by an altered (e.g. grayed, partially transparent "ghost" image, "wire-frame", etc.) rendering of the item. Information that could be provided could also include, for example, the owner's user ID, and any text specified by the user who is trying to locate the item, such as instructions for returning it.

An administrator may select an item in the Missing Items Table for transfer to the user/owner, such as upon determination through investigation that the item belongs to that user. In this case, the item would be removed from one user's inventory, or, if another avatar, teleported from a lost location, and placed in the user/owner's inventory.

When a missing item is recovered or a missing item issue is otherwise resolved, the record may be purged from the Missing Items Table or archived (such as may be done for maintaining history). An archive may be queried for reporting and administrative purposes such as, for example, to determine users who are prone to losing items, or to determine locations that are prone to accidental loss.

In view of the foregoing, it is seen that the invention provides a system and method that may be delivered as a service and/or provided through software which can assist in locating and restoration of an item which may be missing from an inventory or from a VU or region therein and which is particularly advantageous when used with systems supporting designation of items for other avatars. The invention also provides deterrence of undesirable activity of avatars by enhancing detection or communication thereof as well as remedial action by a VU administrator. Of course, variations, perfecting features and/or extensions of the invention may be made within the basic principles and preferred implementations described above.

For example, in a Multiple Virtual Universe environment, an item may be determined to be lost or stolen by one or more of the following techniques for Virtual Universes that share data:

User declaration, such as by selecting a lost item from a list of prior inventory or items or a list of related avatars, such as family members. If the user that lost an item is from a Virtual Universe with partnering relationships or multiple Virtual Universes, this may invoke an alert to "N+1" Virtual Universes.

An alert may invoke an alert to multiple Virtual Universes depending on the severity of the alert. This may also offer another service that an avatar can subscribe to for full coverage with their Virtual Universe memberships.

An alert may be generated and sent to each Virtual Universe that is part of a particular Multiple Virtual Universe partnership. The same format may be applied to multiple Virtual Universes as a single Virtual Universe. The alert may include routing information so that any responses will be sent back to the originator of the alert.

An alert may be logged in the originating—or home— Virtual Universe system and tracked for a specified period of time depending, which may vary based on the Virtual Universe that the user belongs to.

In some embodiments a fee may be charged to use the missing item services described herein. Such fee may be charged on a per-use basis, as a recurring service fee, or as a one-time or lifetime fee for use of the service.

If desired, Virtual Universes may be enabled to supply data fields that are associated with specific items in order to help the Virtual Universe system or administrators better understand the disposition of such items. As Virtual Universes become more complex, distinguishing between items that are intentionally left in a location and items that are lost or stolen may be more difficult. Such data fields may include information that provides answers to questions such as the following:

Has the item intentionally been left on the landscape?
    Yes, No, Undefined
Current owner name and/or email address of the item
What to do when a missing item is determined to be located
    For example, return the item to user/owner's inventory, send a chat message, e-mail the user outside the Virtual Universe, email the user/owner's parent or employer
How long to wait before doing what is to be done when a missing item is located While shown and described herein as a method and a system, it is understood that the invention further provides various alternative embodiments. For example, in one embodiment shown in FIG. 6, the invention provides a computer-readable/useable medium 22B that includes computer program code to enable a computer infrastructure to automatically manage teleportation movements between locations in virtual environments while determining suitability of requested destinations. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc., collectively depicted at 32), or on one or more data storage portions of a computing device, such as the memory 22A and/or the storage system 22B (e.g., a fixed disk, a read-only memory, a random access memory, a cache memory, etc.), and/or as a data signal 34 (e.g., a propagated signal) traveling over a network 105 as depicted in FIG. 1 (e.g., during a wired/wireless electronic distribution of the program code).

Still yet, computer infrastructure 10 is intended to demonstrate that some or all of the components of implementation could be deployed, managed, serviced, etc. by a service provider who offers to implement, deploy, and/or perform the functions of the present invention for automatically managing teleportation movements between locations in virtual environments while determining suitability of requested destinations, for example by licensing methods and browser or application server technology according to the present invention to an internet service providers (ISP) or cellular telephone provider. In one embodiment the invention may comprise a business method that performs the process steps of the invention on a subscription, advertising, and/or fee basis. Thus a service provider can create, maintain, support, etc., a computer infrastructure 12 including computing device 14, such as the computer infrastructure 10 that performs the process steps of the invention for automatically manage teleportation movements between locations in virtual environments while determining suitability of requested destinations, and in return the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of an application 30 comprising a set of instructions including program control 44 intended to cause a computing device 20 having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver 24 for a particular computing and/or I/O device 28, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

While the invention has been described in terms of a single preferred embodiment, those skilled in the art will recognize that the invention can be practiced with modification within the spirit and scope of the appended claims.

What is claimed is:

1. A system for a virtual universe in which missing items may be located, comprising:
    a computer hosting a virtual universe, said computer being connected to a network to which one or more user terminals for users of the virtual universe are also connected;
    a database storing data accessible by said computer hosting the virtual universe, said database containing metadata for an item in the virtual universe, said metadata comprising a unique identifier and designating said item as owned by a user, and said database being in communication with the computer to exchange information enabling the computer to use the metadata to scan the virtual universe for the unique identifier of the item responsive to an input from an owner of an item that said item is thought to be missing;
    a user interface connected to one of said one or more user terminals, said user interface being capable of informing an owner of said item thought to be missing as to the location of said item in response to output received from the computer when the location of the item is determined; and
    communication apparatus to issue an alert to a user of the virtual universe, said alert providing notice that a process is underway to determine the location of the item in the virtual universe; and change the graphic rendering of the item being sought when the process of scanning for the item begins.

2. The system of claim 1, further comprising a telecommunications system for a user of the virtual universe to speak to a system administrator about said item.

3. The system of claim 2, wherein said telecommunications system is an IP telephony system.

4. The system of claim 1, wherein the network connecting said computer hosting the virtual universe to said one or more user terminals is the Internet.

5. The system of claim 1, wherein at least one of said one or more user terminals is a general purpose reprogrammable computer.

6. The system of claim 1, wherein at least one of said one or more user terminals is a personal digital assistant.

7. The system of claim 1, wherein at least one of said one or more user terminals is a telephone.

8. A method of locating missing items in a virtual universe that is hosted by a computer and used by a plurality of users, comprising the steps of:
    assigning a unique identifier to an item designating the item as owned by a user, wherein the computer performs the assigning;
    storing, in a database accessible by said computer, said unique identifier as a field of metadata designating said item as owned by said user;
    receiving input by the user for a particular item input by the user as thought to be lost or stolen;
    scanning, performed by said computer, the metadata of the virtual universe for the unique identifier;
    sending, performed by said computer, output to a user interface and informing the item's owner as to the location of the item input by the user as thought to be lost or stolen in the virtual universe;
    issuing an alert to a user of the virtual universe, said alert providing notice that a process is underway to determine the location of the item in the virtual universe; and changing the graphic rendering of the item being sought when the process of scanning for the item begins.

9. The method of claim 1, wherein said alert includes instructions for a user of the virtual universe to speak to a system administrator about said item.

10. The method of claim 1, further comprising the step of including in said alert a description of an avatar of a user believed to have taken the item.

11. The method of claim 1, wherein said user of the virtual universe receiving said alert is not the owner of said item.

12. The method of claim 1, further comprising the step of moving the item from the location in which it is found to the owner's inventory of virtual universe items when the location of the item is determined.

13. The method of claim 1, wherein said item is the avatar of another user of the virtual universe.

14. A non-transitory machine-readable medium containing machine-readable instructions for locating missing items in a virtual universe said instructions, when executed on a computer hosting a virtual universe, causing said computer to perform operations of:
- employing a unique identifier readable by said computer to designate an item as property of a user;
- interacting with a database containing said unique identifier as metadata for said item in the virtual universe;
- searching for said unique identifier for said item in said database;
- determining a location of said item in the virtual universe by scanning the virtual universe for an item having the same unique identifier; and
- sending output to a user interface to inform the item's owner as to the item's location when the location of the item is determined;
- issuing an alert to a user of the virtual universe, said alert providing notice that a process is underway to determine the location of the item in the virtual universe; and
- changing the graphic rendering of the item being sought when the process of scanning for the item begins.

15. The machine-readable medium of claim 14, including further instructions to cause said computer to send output to a user interface of a user of the virtual universe, said output providing an alert that a process is underway to determine the location of the item in the virtual universe.

16. A method of operating a virtual universe comprising a plurality of networked data processors, wherein said method comprises configuring a selected client data processor to perform operations of:
- instructing a computer hosting a virtual universe to employ a unique identifier readable by said computer to designate an item as property of a user;
- instructing said computer to interact with a database containing said unique identifier as metadata for said item in the virtual universe;
- instructing said computer to look up said unique identifier for said item in said database;
- instructing said computer to determine the location of said item in the virtual universe by scanning the virtual universe for an item having the same unique identifier; and
- instructing said computer to send output to a user interface to inform the owner of the item as to the location of the item when the location of the item is determined;
- issuing an alert to a user of the virtual universe, said alert providing notice that a process is underway to determine the location of the item in the virtual universe; and
- changing the graphic rendering of the item being sought when the process of scanning for the item begins.

17. A method of operating a virtual universe comprising a plurality of networked data processors, said method comprising a step of
- configuring at least one data processor of said plurality of said data processors to provide:
- a computer hosting a virtual universe, said computer being connected to a network to which one or more user terminals for users of the virtual universe are also connected;
- a database storing data accessible by said computer hosting the virtual universe, said database containing metadata for an item in the virtual universe, said metadata comprising a unique identifier designating said item as owned by a user, and said database being in communication with the computer to exchange information enabling the computer to use the metadata to scan the virtual universe for the unique identifier of the item;
- a user interface connected to one of said one or more user terminals, said user interface being capable of informing an owner of said item as to the location of said item in response to output received from the computer when the location of the item is determined; and communication apparatus to issue an alert to a user of the virtual universe, said alert providing notice that a process is underway to determine the location of the item in the virtual universe and change the graphic rendering of the item being sought when the process of scanning for the item begins.

* * * * *